United States Patent [19]

Engman

[11] 4,403,378
[45] Sep. 13, 1983

[54] PIPE CLAMP MEANS

[75] Inventor: Arnold B. Engman, Des Moines, Iowa

[73] Assignee: EMCO Industries, Inc., Des Moines, Iowa

[21] Appl. No.: 327,899

[22] Filed: Dec. 7, 1981

[51] Int. Cl.³ .......................................... B65D 63/00
[52] U.S. Cl. ...................................... 24/277; 285/420
[58] Field of Search ................. 24/243 E, 277, 23 W, 24/20 CW; 285/199, 420; 228/142

[56] References Cited

U.S. PATENT DOCUMENTS

| | | | |
|---|---|---|---|
| 2,831,244 | 4/1958 | Adell | 228/142 |
| 2,993,255 | 7/1961 | Vagiel | 285/420 |
| 3,305,998 | 2/1967 | Deisenroth | 228/142 |
| 3,919,747 | 11/1975 | Offterdinger | 285/199 |

FOREIGN PATENT DOCUMENTS

| | | | |
|---|---|---|---|
| 415498 | 6/1925 | Fed. Rep. of Germany | 285/420 |
| 790625 | 2/1958 | United Kingdom | 285/420 |

Primary Examiner—Robert A. Hafer
Attorney, Agent, or Firm—Zarley, McKee, Thomte, Voorhees & Sease

[57] ABSTRACT

A clamp for securing pipe sections together comprising a saddle portion having a straight back portion, and opposite side portions having semi-circular openings therein. A U-shaped bolt has its ends extending through said back portion with nuts threaded thereon to draw the bolt towards the saddle portion. A radially disposed slot is disposed at the apex of each semi-circular opening to permit said back portion to deflect as said semi-circular openings conform to the perimeter of a pipe as said U-shaped bolt is drawn towards said saddle portion.

1 Claim, 5 Drawing Figures

PIPE CLAMP MEANS

BACKGROUND OF THE INVENTION

Pipe clamps for use in securing together tail pipe sections, or related pipe segments, are common in the art. Among these prior art devices are saddle elements with semi-circular openings used in conjunction with a U-bolt which can be drawn towards the saddle elements. However, the rigidity of the saddle elements sometimes prevents the clamp from completely conforming to the pipe sections involved, thus impairing the integrity of the pipe connection.

It is therefore a principal object of this invention to provide a clamp for securing pipe sections together which will allow the clamp to effectively conform to the perimeter of the pipe.

A further object of the invention is to provide a pipe clamp means which is economical of manufacture.

These and other objects will be apparent to those skilled in the art.

BRIEF DESCRIPTION OF THE INVENTION

A clamp for securing pipe sections is disclosed comprising a saddle element having a straight back portion and opposite side portions with semi-circular openings therein. A U-shaped bolt is secured to the saddle element and can be drawn to the saddle element by nuts on the threaded ends of the U-shaped bolt. This structure is conventional.

The invention herein dwells in the use of a radially extending slot located at the apex of the semi-circular openings which "weaken" the side portions wherein:

the back portion can be deflected as the U-shaped bolt is drawn to the saddle element around the pipe sections. The deflection of the back portion as the slot partially collapses allows the semi-circular openings to better conform to the outer perimeter of the pipe sections.

DETAILED DESCRIPTION OF THE PREFERRED EMBODIMENT

Figure 1:
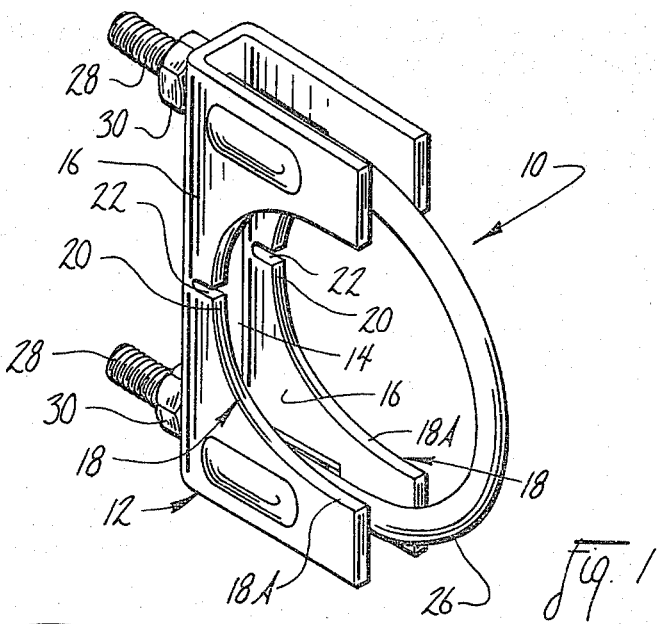
FIG. 1 is a perspective view of the invention.

The numeral 10 designates a pipe clamp of this invention. Saddle 12 includes an elongated flat straight back portion 14 which is integrally secured to said portions 16. Each side portion 16 has a semi-circular opening 18 with a semi-circular perimeter portion 18A. At the apex 20 of each opening 18 is located an elongated radially extending slot 22. The slots 22 are adjacent the midpoint 24 of back portion 14.

A U-shaped bolt 26 has its ends 28 threaded, and are adapted to threadably receive nuts 30. Bolt ends 28 are adapted to extend through apertures 32 in back portion 14.

Figure 2:
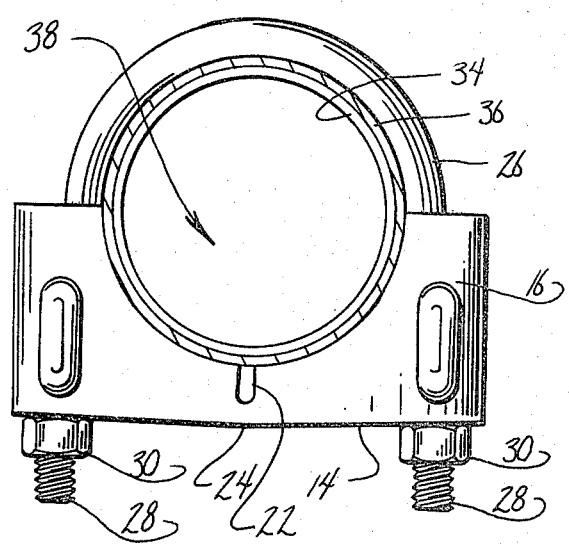
FIG. 2 is a front plan view of the invention.
Figure 3:
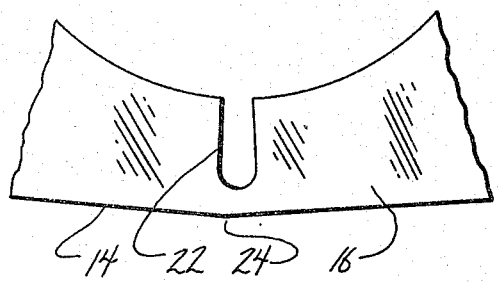
FIG. 3 is an enlarged partial view of FIG. 2.
Figure 4:
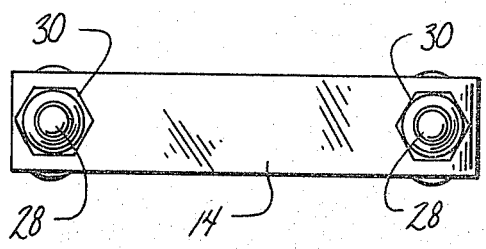
FIG. 4 is bottom end plan view of the invention.
Figure 5:
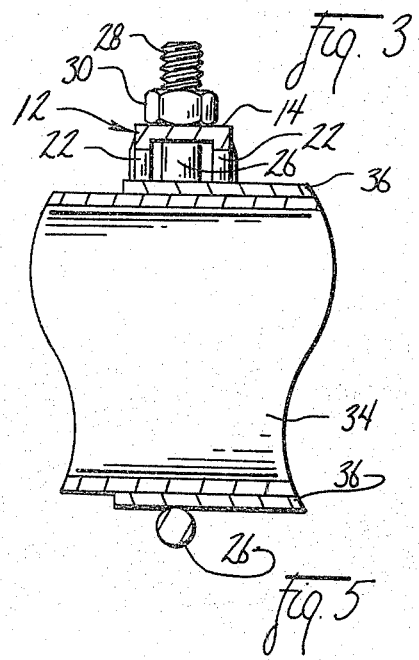
FIG. 5 is a partial sectional view of the invention.

The numerals 34 and 36 designate telescopically disposed pipes to be secured together. Pipes 34 and 36 are adapted to be inserted into aperture 38 formed between U-bolt 26 and the semi-circular openings 18 when the U-bolt is in loosened condition with respect to saddle 12. When the pipes 34 and 36 are positioned within the clamp as shown in FIG. 2, the nuts 30 are tightened on U-bolt 26. As this tightening process continues, the sides of slots 22 converge or collapse towards each other, and back portion 14 tends to deflect at midpoint 24 as the semi-circular portions 18A and U-bolt 26, tightly conform to the outer perimeter of pipe 36.

As a result, this clamp can effectively seal the two pipes 34 and 36 together completely around the peripheries thereof.

I claim:

1. A clamp for securing telescopic positioned pipe sections together, comprising, a saddle portion being U-shaped in cross-section and having a straight back portion, and opposite side portions, each side portion having semi-circular openings adapted to engage a portion of a pipe perimeter, a U-shaped bolt means having opposite ends and being positioned to form a pipe-receiving aperature with said semi-circular openings, said back portion having apertures to receive the ends of said U-shaped bolt means, tightening means on the ends of said bolt means to draw said U-shaped bolt means towards said saddle portion, a radially disposed slot having parallel opposite sides and an arcuate bottom, said slot being located at the apex of each of said semi-circular openings to facilitate the deflection of said back portion and to facilitate the conformation of said semi-circular openings to pipe sections extending through said pipe-receiving aperture as said tightening means draws said U-shaped bolt means towards said saddle portion to partially collapse said slot.

* * * * *